US010482336B2

(12) United States Patent
Burge et al.

(10) Patent No.: US 10,482,336 B2
(45) Date of Patent: Nov. 19, 2019

(54) FACE RECOGNITION AND IMAGE SEARCH SYSTEM USING SPARSE FEATURE VECTORS, COMPACT BINARY VECTORS, AND SUB-LINEAR SEARCH

(71) Applicant: NOBLIS, INC., Reston, VA (US)

(72) Inventors: Mark J. Burge, Falls Church, VA (US); Jordan Cheney, Vienna, VA (US)

(73) Assignee: NOBLIS, INC., Reston, VA (US)

( * ) Notice: Subject to any disclaimer, the term of this patent is extended or adjusted under 35 U.S.C. 154(b) by 63 days.

(21) Appl. No.: 15/724,936

(22) Filed: Oct. 4, 2017

(65) Prior Publication Data

US 2018/0101742 A1 Apr. 12, 2018

Related U.S. Application Data

(60) Provisional application No. 62/405,721, filed on Oct. 7, 2016.

(51) Int. Cl.
| | |
|---|---|
| *G06K 9/00* | (2006.01) |
| *G06K 9/62* | (2006.01) |
| *G06F 16/51* | (2019.01) |
| *G06F 16/583* | (2019.01) |
| *G06F 16/36* | (2019.01) |

(52) U.S. Cl.
CPC ....... *G06K 9/00926* (2013.01); *G06F 16/367* (2019.01); *G06F 16/51* (2019.01); *G06F 16/5838* (2019.01); *G06K 9/00228* (2013.01); *G06K 9/00275* (2013.01); *G06K 9/00288* (2013.01); *G06K 9/6269* (2013.01)

(58) Field of Classification Search
CPC ........... G06K 9/00926; G06K 9/00228; G06K 9/6269; G06K 9/00274; G06F 17/3028
See application file for complete search history.

(56) References Cited

U.S. PATENT DOCUMENTS

| | | |
|---|---|---|
| 6,826,300 B2 | 11/2004 | Liu et al. |
| 7,362,887 B2 | 4/2008 | Oohashi et al. |
| 7,853,049 B2 | 12/2010 | Lee |

(Continued)

OTHER PUBLICATIONS

Xia et al: "Supervised Hashing for Image Retrieval via Image Representation Learning", 2014. (Year: 2014).*

(Continued)

*Primary Examiner* — Ruiping Li
(74) *Attorney, Agent, or Firm* — Morrison & Foerster LLP

(57) ABSTRACT

Systems and methods are provided for performing automated face recognition and comparison. An input image of a face may be received and cropped, and the image may be processed through a deep neural network (DNN) to produce a k-dimensional feature vector. The k-dimensional feature vector may be converted to a k-dimensional binary vector by transforming each value in the vector to either 1 or 0. To search for nearest matches of the image in a database of gallery images of faces, the system may compare sub-strings of the binary vector to hash tables created from sub-strings of the gallery images, enabling sub-linear searching that allows locating the closest matches from among the entire gallery without requiring an exhaustive linear search of the entire gallery.

27 Claims, 8 Drawing Sheets

(56) References Cited

U.S. PATENT DOCUMENTS

| | | |
|---|---|---|
| 8,073,287 B1 | 12/2011 | Wechsler et al. |
| 8,571,273 B2 | 10/2013 | Li et al. |
| 8,958,647 B2 | 2/2015 | Irie |
| 9,036,917 B2 | 5/2015 | Kaneda et al. |
| 9,053,388 B2 | 6/2015 | Ito et al. |
| 9,129,148 B1 | 9/2015 | Li et al. |
| 9,141,851 B2 | 9/2015 | Sarkis et al. |
| 9,183,429 B2 | 11/2015 | Qi et al. |
| 9,311,564 B2 | 4/2016 | Savvides et al. |
| 9,323,980 B2 | 4/2016 | Sun |
| 9,405,465 B2 | 8/2016 | Klare et al. |
| 9,767,348 B2 | 9/2017 | Klare et al. |
| 2012/0288167 A1 | 11/2012 | Sun et al. |
| 2014/0043329 A1 | 2/2014 | Wang et al. |
| 2014/0067679 A1 | 3/2014 | O'Reilly et al. |
| 2014/0093142 A1 | 4/2014 | Hayasaka et al. |
| 2014/0376819 A1* | 12/2014 | Liu ............ G06K 9/3233 382/205 |
| 2015/0055834 A1 | 2/2015 | Zou et al. |
| 2015/0131868 A1 | 5/2015 | Rooyakkers et al. |
| 2015/0366328 A1 | 12/2015 | Tamura et al. |
| 2016/0125308 A1 | 5/2016 | Bohne et al. |

OTHER PUBLICATIONS

He et al: "Learning predictable binary codes for face indexing", 2015, (Year: 2015).*

Ahonen, T. et al. (Dec. 2006). "Face Description with Local Binary Patterns: Application to Face Recognition," *IEEE Transactions on Pattern Analysis and Machine Intelligence* 28(12):2037-2041.

Belhumeur, P. N. et al. (Jul. 1997). "*Eigenfaces* vs. *Fisherfaces*: Recognition Using Class Specific Linear Projection," *IEEE Transactions on Pattern Analysis and Machine Intelligence* 19(7):711-720.

Dalal, N., et al. "Histograms of Oriented Gradients for Human Detection," *IEEE Computer Society Conference on Computer Vision and Pattern Recognition*, 2005, Montbonnot, France: 8 pages.

Cao et al., Face recognition with learning-based descriptor, 2010 IEEE Conference on Computer Vision and Pattern Recognition.

Klare et al., "Heterogeneous face recognition: matching NIR to visible light images", 2010 International Conference on Pattern Recognition.

Oh, "Face recognition using Radial Basis Function network based on LDA", World Academy of Science, Engineering and Technology 7 2005.

Klare et al., U.S. Office Action dated Nov. 9, 2016, directed to U.S. Appl. No. 15/223,446; 7 pages.

* cited by examiner

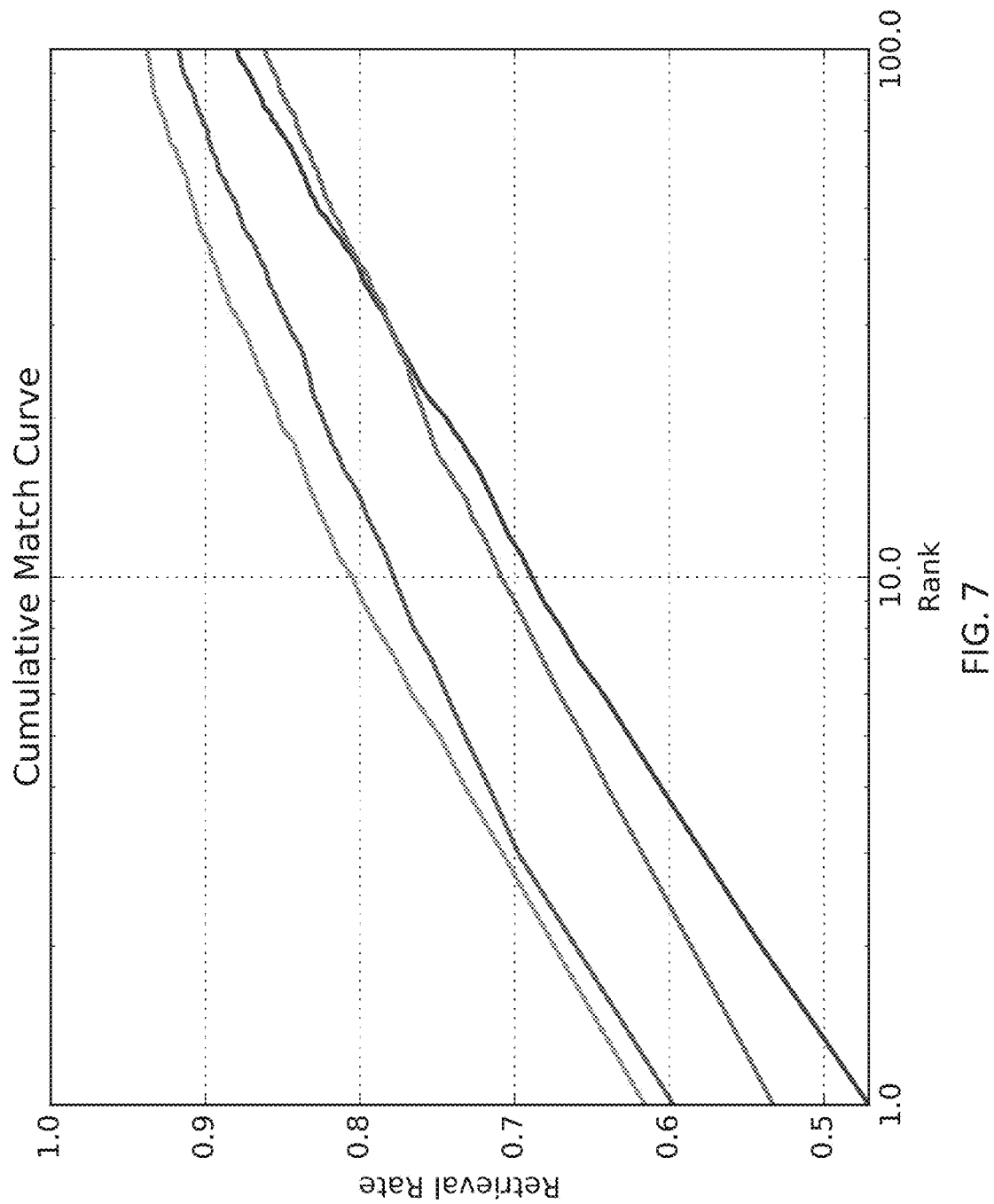

FACE RECOGNITION AND IMAGE SEARCH SYSTEM USING SPARSE FEATURE VECTORS, COMPACT BINARY VECTORS, AND SUB-LINEAR SEARCH

REFERENCE TO RELATED APPLICATIONS

This application claims the benefit of U.S. Provisional Application No. 62/405,721, entitled, "FACE RECOGNITION AND IMAGE SEARCH SYSTEM USING SPARSE FEATURE VECTORS, COMPACT BINARY VECTORS, AND SUB-LINEAR SEARCH," filed Oct. 7, 2016, the entire contents of which are incorporated herein by reference.

FIELD OF THE INVENTION

This relates to systems and methods for face recognition and image searching.

BACKGROUND OF THE INVENTION

Images and videos are being disseminated in the open source, particularly on the internet, at an unprecedented rate. It is estimated that on average, every minute, hundreds of thousands of images are shared on social media websites alone. On YouTube, on average, over 100 hours of video comprising over 8 million images are shared every minute. This vast number of images can contain information that is highly valuable. For example, the ability to perform face recognition across the internet could be useful in finding exploited children, protecting or exploiting clandestine assets, locating war criminals, understanding criminal and terrorist networks, and other uses including but not limited to uses by the intelligence community, for cross-agency support, and in entertainment applications.

SUMMARY OF THE INVENTION

In order to perform face recognition searches on networks and on the internet, computationally-efficient and cost-effective solutions are required to accommodate the scale and rate of production of available images, and to efficiently compare representations of images of faces against extremely large databases of other such representations of images of faces. In the field of automated face recognition, known techniques leverage human-designed algorithms to create representations of images of faces that are inefficient and/or slow to create, unreliable in their ability to differentiate faces, and too large to efficiently or feasibly be compared to large numbers of other such representations of images of faces. Accordingly, there is a need for improved systems, methods, and interfaces that perform visual analytics, particularly automated face recognition, with sufficient efficiency and on a sufficiently-large scale to be able to process the vast amount of image data available in the open source and elsewhere in order to create small and accurate representations of images of faces. In particular, there is a need for face recognition and image search systems capable of creating feature vectors that are small enough in data size to be compared to large numbers of other such feature vectors in a sub-linear fashion, without significantly sacrificing accuracy and reliability.

As disclosed herein, hardware and software infrastructure is provided for ingesting and processing large numbers of images of faces, and for efficiently producing sparse feature vectors and binary vectors of small enough data size to feasibly and efficiently be compared using sub-linear search methods. In some embodiments, images are enrolled into a system by use of a deep neural network (DNN) configured to produce a sparse feature vector from a cropped, non-aligned image of a face. The DNN may be configured to produce a sparse feature vector having about one or more orders of magnitude fewer (e.g., about 1 order of magnitude fewer, about 2 orders of magnitude fewer, etc.) degrees of freedom than the total degrees of freedom analyzed by one or more layers of the DNN. In some embodiments, post-processing is applied to binarize the sparse feature vector into a binary vector of very compact data size, such that the binary vector may be efficiently compared using sub-linear search techniques to databases having on the order of hundreds of millions or billions of images of faces, and such that the nearest matches in the such a database may be located in far less time than would be required to perform an exhaustive linear search of all images in the database.

Additionally, the methods and systems provided may include a computer implemented system for ingestion of images, extraction of information from those images, and exploitation of the extracted information. Ingestion of images may be achieved by having the system crawl web pages, scrape images and videos from web pages, and detect faces in the scraped images and videos. Extraction of images may include subjecting scraped images to one or more face recognition algorithms, such as those described above with respect to using a DNN, binarization, and sub-linear search. Exploitation of the extracted information may include providing a user interface, such as a web-based user interface, that facilitates performing searches for faces that are similar to a face inputted as an image by a user.

In some embodiments, a method is performed by a search system including one or more servers for enrollment and searching, for searching a database of gallery binary vectors representing gallery images of faces, the method comprising: receiving an input image of a face; processing the received input image of the face, comprising: processing through a plurality of layers of a deep neural network (DNN) to generate a k-dimensional feature vector; and binarizing the feature vector to generate a k-dimensional binary vector by converting respective values in the feature vector to corresponding values of 0 or 1 in the binary vector, wherein the conversion is based on whether respective values in the feature vector satisfy predefined criteria; dividing the binary vector into a plurality of sub-strings; creating a plurality of hash tables based on sub-strings of gallery binary files; comparing one or more of the sub-strings of the binary vector to the one or more of the hash tables to identify a subset of the gallery binary vectors that are closest matches to the binary vector.

In some embodiments of the method, processing the received input image of the face comprises, prior to processing the image through the DNN, cropping the input image of the face to a predefined size.

In some embodiments of the method, identifying the subset of the gallery binary vectors that are the closest matches is based on a number of comparisons that is less than a total number of gallery binary vectors from which the closest matches are identified.

In some embodiments of the method, identifying the subset of the gallery binary vectors that are the closest matches is based on a number of comparisons that is equal to or less than log(N), where N is a total number of gallery binary vectors from which the closest matches are identified.

In some embodiments of the method, the DNN comprises a fully connected layer configured to reduce dimensionality in the output k-dimensional feature vector to k.

In some embodiments of the method, k is less than 1/500 the number of data dimensions the cropped input image of the face input into DNN.

In some embodiments of the method, k is 256.

In some embodiments of the method, the binary vector is less than 1/4000 the file size of the cropped input image of the face input into the DNN.

In some embodiments of the method, the binary vector is 32 bytes in file size.

In some embodiments, a system for searching a database of gallery binary vectors representing gallery images of faces is provided, the system comprising one or more servers for enrollment and searching and memory, the memory storing instructions that, when executed by the one or more servers, cause the one or more servers to: receive an input image of a face; process the received input image of the face, comprising: processing through a plurality of layers of a deep neural network (DNN) to generate a k-dimensional feature vector; and binarizing the feature vector to generate a k-dimensional binary vector by converting respective values in the feature vector to corresponding values of 0 or 1 in the binary vector, wherein the conversion is based on whether respective values in the feature vector satisfy predefined criteria; divide the binary vector into a plurality of sub-strings; create a plurality of hash tables based on sub-strings of gallery binary files; and compare one or more of the sub-strings of the binary vector to the one or more of the hash tables to identify a subset of the gallery binary vectors that are closest matches to the binary vector In some embodiments of the system, processing the received input image of the face comprises, prior to processing the image through the DNN, cropping the input image of the face to a predefined size In some embodiments of the system, identifying the subset of the gallery binary vectors that are the closest matches is based on a number of comparisons that is less than a total number of gallery binary vectors from which the closest matches are identified.

In some embodiments of the system, identifying the subset of the gallery binary vectors that are the closest matches is based on a number of comparisons that is equal to or less than log(N), where N is a total number of gallery binary vectors from which the closest matches are identified.

In some embodiments of the system, the DNN comprises a fully connected layer configured to reduce dimensionality in the output k-dimensional feature vector to k.

In some embodiments of the system, k is less than 1/500 the number of data dimensions the cropped input image of the face input into DNN.

In some embodiments of the system, k is 256.

In some embodiments of the system, the binary vector is less than 1/4000 the file size of the cropped input image of the face input into the DNN.

In some embodiments of the system, the binary vector is 32 bytes in file size.

In some embodiments, a non-transitory computer-readable storage medium storing instructions is provided. In some embodiments, the instructions, when executed by one or more servers for enrollment and searching, cause the one or more servers to: receive an input image of a face; process the received input image of the face, comprising: processing through a plurality of layers of a deep neural network (DNN) to generate a k-dimensional feature vector; and binarizing the feature vector to generate a k-dimensional binary vector by converting respective values in the feature vector to corresponding values of 0 or 1 in the binary vector, wherein the conversion is based on whether respective values in the feature vector satisfy predefined criteria; divide the binary vector into a plurality of sub-strings; create a plurality of hash tables based on sub-strings of gallery binary files; and compare one or more of the sub-strings of the binary vector to the one or more of the hash tables to identify a subset of the gallery binary vectors that are closest matches to the binary vector.

In some embodiments of the non-transitory computer-readable storage medium, processing the received input image of the face comprises, prior to processing the image through the DNN, cropping the input image of the face to a predefined size.

In some embodiments of the non-transitory computer-readable storage medium, identifying the subset of the gallery binary vectors that are the closest matches is based on a number of comparisons that is less than a total number of gallery binary vectors from which the closest matches are identified.

In some embodiments of the non-transitory computer-readable storage medium, identifying the subset of the gallery binary vectors that are the closest matches is based on a number of comparisons that is equal to or less than log(N), where N is a total number of gallery binary vectors from which the closest matches are identified.

In some embodiments of the non-transitory computer-readable storage medium, the DNN comprises a fully connected layer configured to reduce dimensionality in the output k-dimensional feature vector to k.

In some embodiments of the non-transitory computer-readable storage medium, k is less than 1/500 the number of data dimensions the cropped input image of the face input into DNN.

In some embodiments of the non-transitory computer-readable storage medium, k is 256.

In some embodiments of the non-transitory computer-readable storage medium, the binary vector is less than 1/4000 the file size of the cropped input image of the face input into the DNN.

In some embodiments of the non-transitory computer-readable storage medium, the binary vector is 32 bytes in file size.

BRIEF DESCRIPTION OF THE DRAWINGS

FIG. 7 is a graph showing cumulative match characteristic (CMC) of a system in accordance with some embodiments.

DETAILED DESCRIPTION OF THE INVENTION

Figure 1:
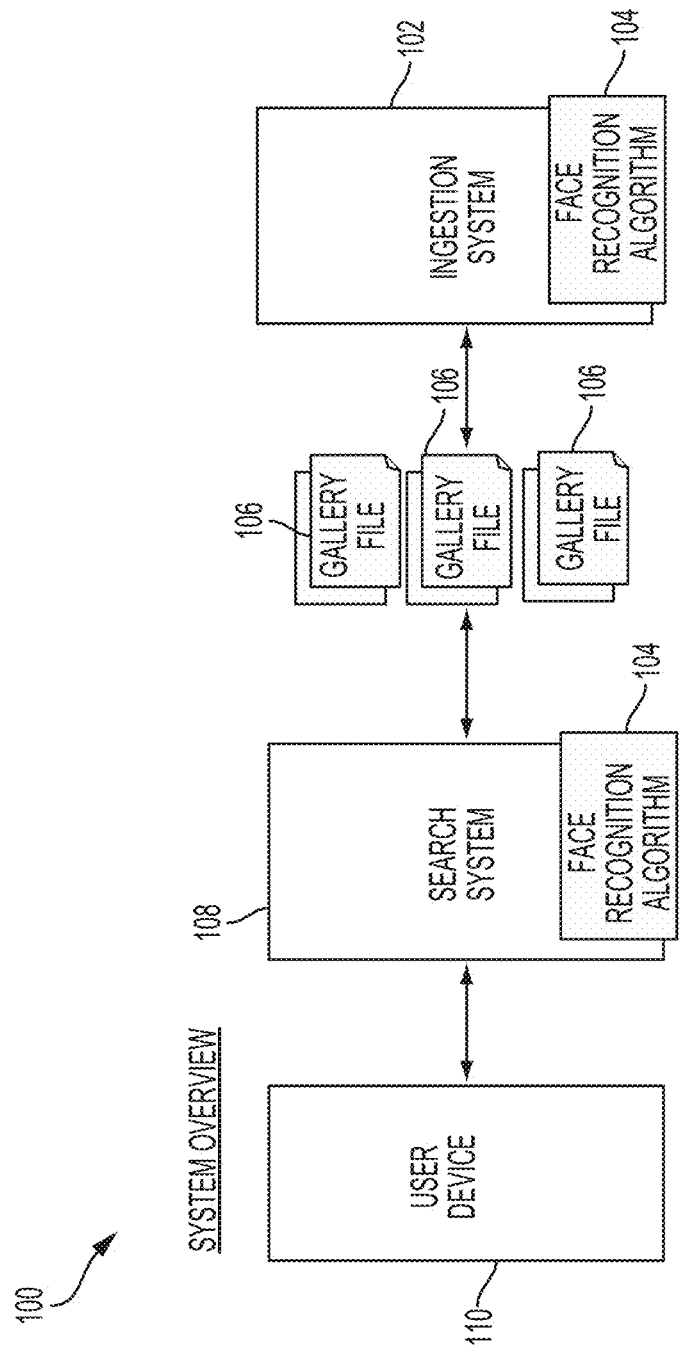
FIG. 1 is a block diagram of a face recognition and image searching system in accordance with some embodiments.

The following description sets forth exemplary methods, parameters and the like. It should be recognized, however, that such description is not intended as a limitation on the scope of the present disclosure but is instead provided as a description of exemplary embodiments.

There is a need for improved systems, methods, and interfaces that perform visual analytics, particularly automated face recognition, with sufficient efficiency and on a sufficiently-large scale to be able to process the vast amount of image data available in the open source and elsewhere in order to create small and accurate representations of images of faces. In particular, there is a need for face recognition and image search systems capable of creating feature vectors that are small enough in data size to be compared to large numbers of other such feature vectors in a sub-linear fashion, without significantly sacrificing accuracy and reliability. Such systems, methods, and interfaces may allow the efficient creation of compact representations of images of faces that are capable of being quickly and accurately compared to large databases of other such compact representations, such that small subsets of the closest-matching other images of faces may be reliably and accurately identified from among databases having hundreds of millions or billions of images of faces, without the need to exhaustively search through every image in the database.

Below, FIGS. 1-5 provide a description of exemplary systems and methods for performing the techniques for face recognition and image searching disclosed herein.

Although the following description uses terms first, second, etc. to describe various elements, these elements should not be limited by the terms. These terms are only used to distinguish one element from another.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

FIG. 1 is a block diagram illustrating exemplary components for image ingestion, face recognition analysis, and image searching in accordance with some embodiments. In some embodiments, a system 100 includes an ingestion system 102. The ingestion system 102, which will be described in greater detail below, may include one or more servers connected to a source of images and videos, the source including any public or private computer database or network, such as the internet. The ingestion system 102 includes a face recognition algorithm 104, which may be a set of instructions maintained on a non-transitory computer readable storage medium connected to one or more of the servers in the ingestion system 102. The face recognition algorithm 104, which will be explained in greater detail below, is used by the ingestion system 102 to extract feature vectors (which may be sparse feature vectors or a non-sparse feature vector, as discussed below) and/or binary vectors from source images and create templates to be saved in gallery files 106.

The system 100 further includes a plurality of gallery files 106 that may be stored in any suitable computer storage system or database. The gallery files 106 may include templates, which may include a feature vector and/or a binary vector which may be obtained from binarizing a feature vector. A feature vector and/or binary vector may represent an image of the face, and each may be created by applying, by the ingestion system 102, the face recognition algorithm 104 to source images. In some embodiments, a feature vector may be a 1000-dimensional vector of about between 1 and kilobytes. In other embodiments, a feature vector may be a 4096-dimensional vector of between 1 and 16 kilobytes. In some embodiments, a feature vector may be a 256-dimensional vector including floating point values, the vector being about 1 kilobyte in size? In some embodiments, a binary vector may be a 256-dimensional vector containing only 0's and 1's, the binary vector being 256 bits (32 bytes).

In some embodiments, a template may further include a flat binary representation of metadata identifying the algorithm used to create the feature vector and/or binary vector. A template may further include a location identifier, such as a URL, that identifies a source of the image used to create the feature vector and/or binary vector. A template may further include a hash of the original image used to create the feature vector and/or binary vector. This hash may be used in duplicate image detection, and to identify if an image is part of a larger image, such as one from which it was cropped. The database or computer storage system on which the gallery files 106 are stored may be connected in any suitable manner to the ingestion system 102 server(s), such that the gallery files 106 may be transferred from the ingestion system 102 to the database for storage after their creation.

The system 100 also includes a search system 108. The search system may include one or more servers, including one or more master servers and one or more slave servers, connected to the database(s) or storage system(s) containing the gallery files 106 in any suitable manner to communicate with the database(s) or storage system(s). The search system 108 includes another instance of face recognition algorithm 104, as described above with regard to ingestion system 102, connected to one or more of the servers in the search system 108. The face recognition algorithm 104, which will be explained in greater detail below, is used by the search system 108 to extract feature vectors and/or binary vectors from search images input by a user at the user device 110 for comparison against the feature vectors and/or binary vectors stored in the gallery files 106. In some embodiments, the enrollment algorithm 104 is identical in search system 108 and enrollment server 302. In some embodiments, the enrollment algorithm 104 differs between search system 108 and enrollment server 302; for example, the enrollment algorithm 104 may be optimized to run more quickly for searching purposes, while it may be optimized to run more slowly and more thoroughly for ingestion and enrollment purposes.

The system 100 also includes a user device 110, which may access a user interface such as a web-hosted interface, connected in any suitable manner to communicate with the search system 108. The device 110 may include a set of instructions maintained on a non-transitory computer readable storage medium causing the device on which the instructions are maintained to provide an interface for use by a user. The interface may facilitate input by a user of one or more image files or of one or more indications of a location, such as a URL, at which one or more image files may be found.

Figure 2:
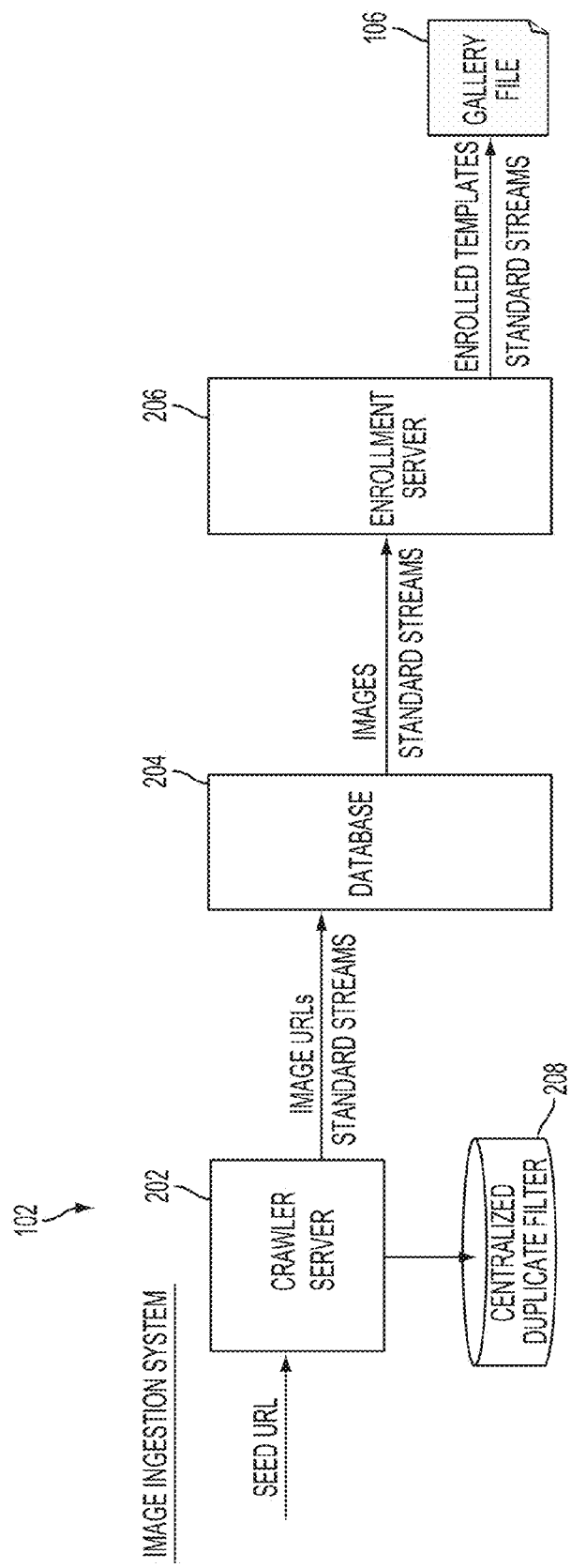
FIG. 2 is a block diagram of an ingestion system in accordance with some embodiments.

FIG. 2 is a block diagram illustrating exemplary components for image ingestion in accordance with some embodiments. The components of ingestion system 102 may be implemented as separate or integrated servers and databases. In some embodiments, ingestion system 102 includes one or more crawler servers 202. In some embodiments, 100 or more crawler servers 202 may be included in the system 102. The crawler servers 202 are coupled to a source of images or videos, such as any public or private computer database or network, such as the internet. The crawler servers 202 include a set of instructions maintained on a non-transitory computer readable storage medium connected to the crawler servers 202, which, when executed by a processor connected to the crawler servers 202, may cause one or more of the servers 202 to crawl image URL's based on a seed page. In some embodiments, the one or more servers 202 start by accessing a seed page, which may be indicated by a seed URL, and then searching the page for images or videos contained on the page. An image or video that is found on the page is downloaded by a crawler server 202 and stored in a database or storage system 204 included in the ingestion system 102. The image stored in the database or storage system 204 is accessed by one or more enrollment servers 206 included in the ingestion system 102. The enrollment server 206 includes a set of instructions maintained on a non-transitory computer readable storage medium connected to the enrollment server 206, which, when executed by a processor connected to the enrollment server 206, may cause the server 206 to apply an image analytic algorithm such as face recognition algorithm 104 to the image accessed from the database 204. The face recognition algorithm 104 creates enrolled templates that include feature vectors and/or binary vectors; the enrolled templates are stored by the enrollment server in a gallery file associated with the respective image scraped by the crawler server(s) 202.

After starting with the seed page, the crawler server 202 follows all links to other network addresses, such as web URL's, located on the seed page, and reiterates the process of scraping all images from each page visited. For each page visited by the one or more crawler servers 202, the process described above is recursively performed so that every image from every page visited can be downloaded into database 204 and subject to face recognition algorithm 104 by enrollment server 206. In this manner, a gallery file 106 comprising a feature vector and/or binary vector may be created for every suitable image located on the seed page, and for every suitable image located on pages accessible by links from the seed page. This automated process may allow the ingestion system 102 to ingest a large number of images and create a large number of gallery files, as is optimal for use by an Internet-scale face recognition and image search system.

Crawler server(s) 202 are also coupled to centralized duplicate filter 208 in any suitable manner to enable communication between the components. Centralized duplicate filter 208 includes a set of instructions maintained on a non-transitory computer readable storage medium, which, when executed by a processor connected to the centralized duplicate filter 208, may cause the duplicate filter 208 to prevent ingestion by the crawler server(s) 202 of an image that is already represented in the system 100 by a gallery file 106. This technique is useful when there are multiple crawler servers 202 operating simultaneously, as the duplicate filter can prevent one crawler server 202 from ingesting an image that another crawler server 202 has previously ingested or is currently ingesting. The duplicate filter 208 may accomplish filtering by comparing the location, such as the URL, of a scraped image to the URL of other scraped images. Alternately or additionally, the duplicate filter 208 may apply primitive reverse-image-search algorithms to an image to check for an exact match to the image among images already scraped, even if the image is located at a different URL. In the event of an exact match to a previously scraped image, the ingestion system 202 stores the URL of the duplicate image and associates it as metadata with the gallery file 106 previously created for the duplicate image, but does not create a new gallery file 106 for the duplicate image.

Figure 3:
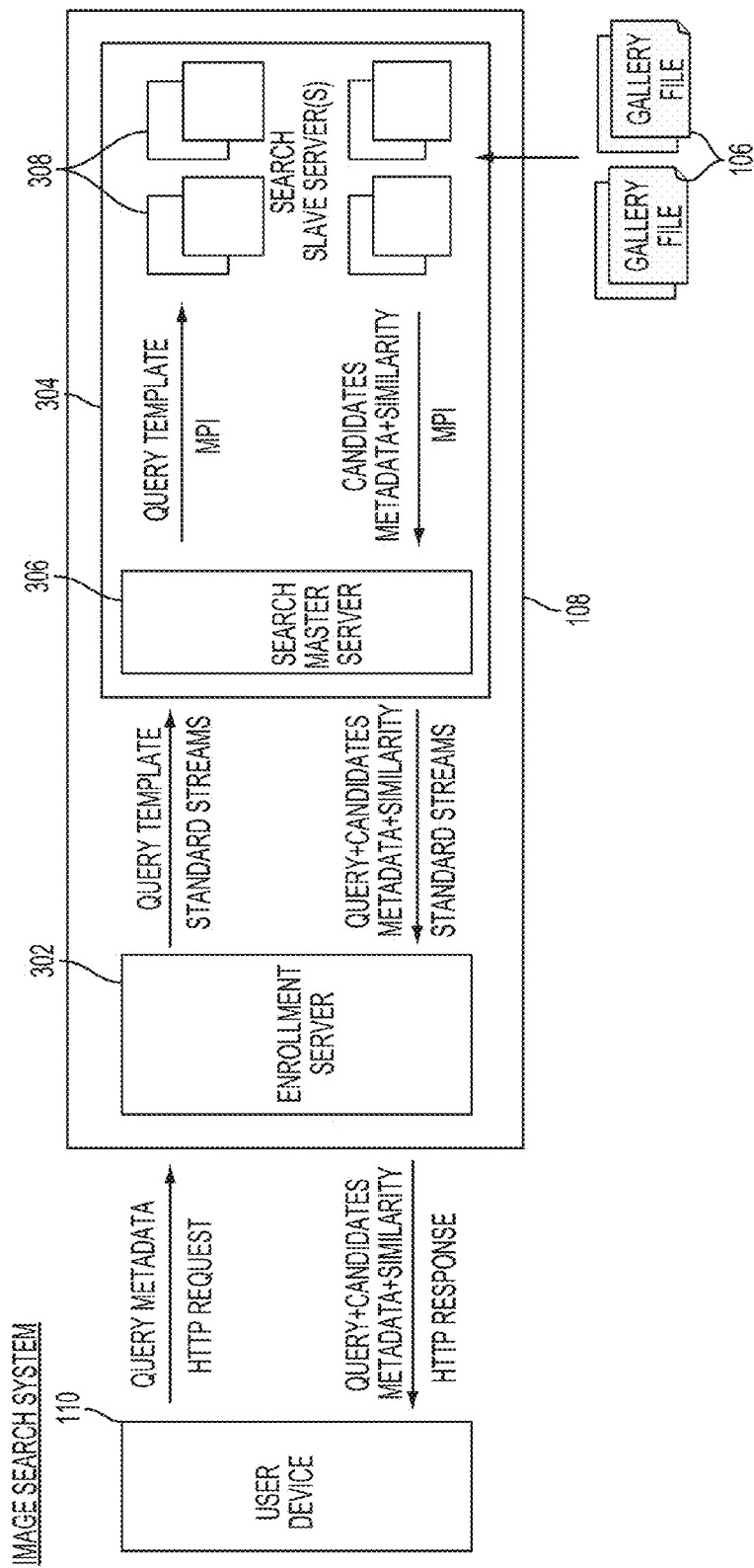
FIG. 3 is a block diagram of a search system in accordance with some embodiments.

FIG. 3 is a block diagram illustrating exemplary components for image searching in accordance with some embodiments. The components of search system 108 may be implemented as separate or integrated servers and databases. In some embodiments, search system 108 includes enrollment server 302. Enrollment server 302 is similar to enrollment server 206 described above with reference to FIG. 2, in that both enrollment servers apply an image analytics algorithm such as face recognition algorithm 104 to images accessed by the server 302 or 206. While enrollment server 206 applies face recognition algorithm 104 to images scraped by crawler server(s) 202, however, enrollment server 302 applies face recognition algorithm 104 to images obtained from or indicated by user device 110, which is coupled to image search system 108 in any suitable manner to allow communication between user device 110 and enrollment server 302, such as by HTTP. For example, the user device 110 transfers query metadata, such as an input URL or a local network address, to search system 108 and enrollment server 302. Search system 108 then accesses the image provided or indicated by user device 110. In some embodiments, the enrollment algorithm 104 is identical in search system 108 and enrollment server 302. In some embodiments, the enrollment algorithm 104 differs between search system 108 and enrollment server 302; for example, the enrollment algorithm 104 may be optimized to run more quickly for searching purposes, while it may be optimized to run more slowly and more thoroughly for ingestion and enrollment purposes.

Templates generated by enrollment server 302, called query templates, by the application of face recognition algorithm 104 to images provided by user device 110, are passed to one or more search servers 304. The generated templates include feature vectors and/or binary vectors generated by face recognition algorithm 104, as well as the original query metadata and image data of the query image. Search server 304 may be one server or multiple servers. In the example shown, search server 304 includes a search master server 306 and a plurality of search slave servers 308. In embodiments with multiple search slave servers 308, such as the example shown, master search server 306 may communicate with one or more slave search servers by any suitable communication means, such as MPI.

The search server 304 and search system 108 are further connected to a database or any suitable computer storage system storing galley files 106. In some embodiments, galley files 106 may be stored inside search system 108, while in other embodiments they may be stored in an external database that is communicatively connected to search system 108. In some embodiments, gallery files 106 may be stored in a random-access memory (RAM) of the search system 108.

Search servers 304 include a set of instructions maintained on a non-transitory computer readable storage medium connected to the search servers 304, which, when executed by a processor connected to the search servers 304, cause the search servers 304 to receive a query template from the enrollment server 302 and transfer the query template from the search master server 306 to a search slave server 308. The search server(s) 304 then scans one or more of gallery templates 106 accessible by the search server(s) 304 and then applies a similarity/search algorithm, which will be described in more detail below. The similarity/search algorithm may compare the query template to the templates including feature vectors and/or binary vectors stored in the gallery files 106 for close matches. In some embodiments, the feature vector and/or binary vector generated to represent the query image may be directly (e.g., individually) compared to the feature vectors and/or binary vectors generated to represent the images previously ingested, which are stored in the gallery files 106. In some embodiments, sub-linear comparison algorithms may be used to determine the identity or location of k number of the closest gallery file matches to the query image from among all of the stored gallery files, as will be discussed further below.

In some embodiments, top candidate gallery files may retrieved by the search server 304. The search server 304 may retrieve a predefined number of top candidate gallery files 106. In embodiments with multiple search slave servers 308, such as the example shown, each search slave server may retrieve a predefined number of top candidate gallery files 106. The retrieved gallery files 106, including the respective associated feature vectors and/or binary vectors and/or metadata, are transferred from the slave search servers 308 to the search master server 306. The search server(s) 304 assigns each candidate gallery file a similarity score based on the closeness of the match. The search server(s) 304 then combines all candidate gallery files provided by any of the search slave servers 308 and selects a second predefined number of the combined candidates as results, based on which of the combined candidates have the highest/strongest score. The search server 304 then transfers the original query, the images associated with the top results, and the metadata associated with the top results back to the enrollment server 302. The similarity scores for the candidates and results are normalized by the search system 108 for presentation to the user. This normalization may be a global normalization that indicates the strength of a result as compared to the strength of other results from past or future searches.

The enrollment server 302 then transfers that data back to the user device 110, such as by HTTP. Based on the data transferred from the search system 108, the user device 110 may then display the top resulting images, respective metadata, and respective similarity scores for the query submitted.

In some embodiments, the search system 108 also causes a new gallery file 106 to be created, based on a query image submitted to the search system 108, and stored in the database of gallery files 106 that the search system 108 searches. In some embodiments, the enrollment server 302 creates a gallery file 106, in a similar manner as discussed above with reference to FIG. 2, and transmits the galley file 106 to be stored in the database. In some embodiments, the search system 108 is coupled to an ingestion system such as the ingestion system 102 discussed above with reference to FIG. 2. The search system 108 transmits data to the ingestion system 102 such that the ingestion system creates and stores a gallery file 106 based on the query image. The search system 108 may transmit the query image itself or the query metadata (which may be used as a seed URL) to the ingestion system 102 for creation of a gallery file 106.

Figure 4:
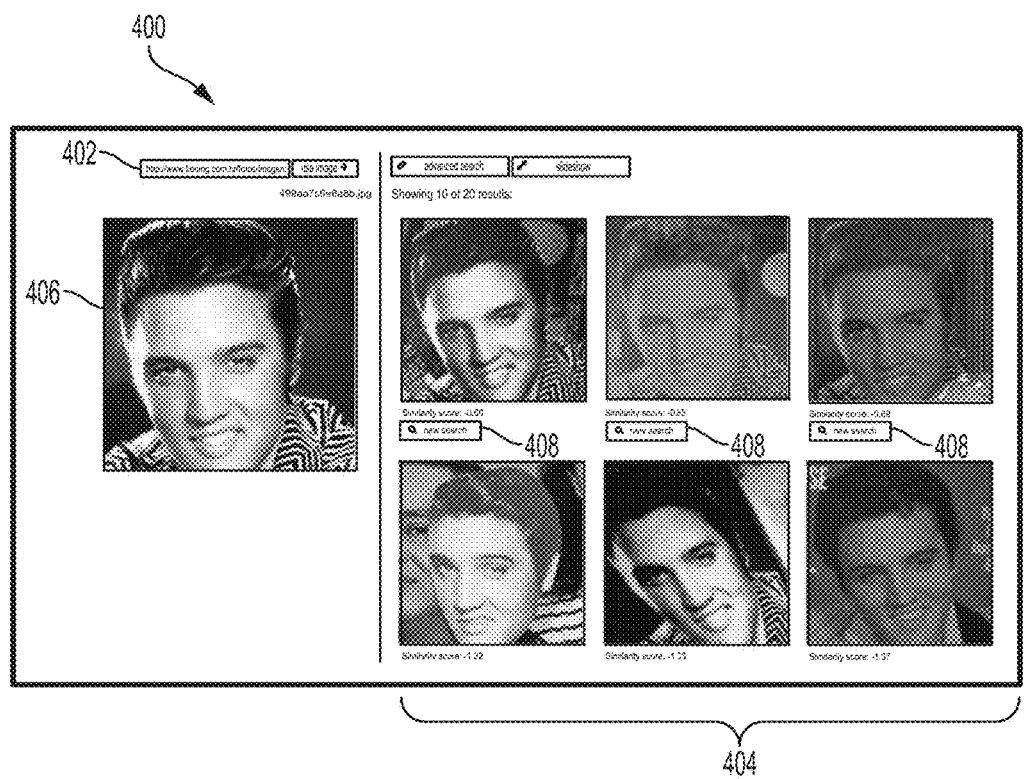
FIG. 4 is a block diagram of a user interface in accordance with some embodiments.

FIG. 4 is a user interface in accordance with some embodiments. In some embodiments, user interface 400 may be executed by a processor of user device 110, described with reference to FIGS. 1 and 3, and caused to be displayed on a display of user device 110. In addition to a processor, the user device 110 includes a display; an input part such as a keyboard, mouse, touch-pad, and/or touch-screen; and a network communication part such as any suitable communicative connection with which to communicate with a local or remote network such as the internet. In some embodiments, user interface 400 includes a query input portion 402 that accepts a query input from a user. A user may input, into the input portion 402, metadata such as a local file location or a URL. In response to the input of such metadata, user device 110 is caused to provide search system 302 with the image file and/or the metadata itself, such that the search system 302 accesses and enrolls the image as described above with reference to FIG. 3. User interface 400 further includes results portion 404, which displays the resulting images and associated scores and associated metadata returned by search system 302 as described above with reference to FIG. 3. User interface 400 further includes query image 406, which displays the query image that the user has indicated in the input portion 402. User interface 100 further includes new search affordances 408, which provide the user with a displayed selectable interface (e.g., a displayed option, such as a button) associated with submitting a respective returned result image as the input image for a new query. A respective new search affordance 408 may be displayed alongside each respective returned result in the results portion 404.

Face-Recognition Method

Figure 5A:
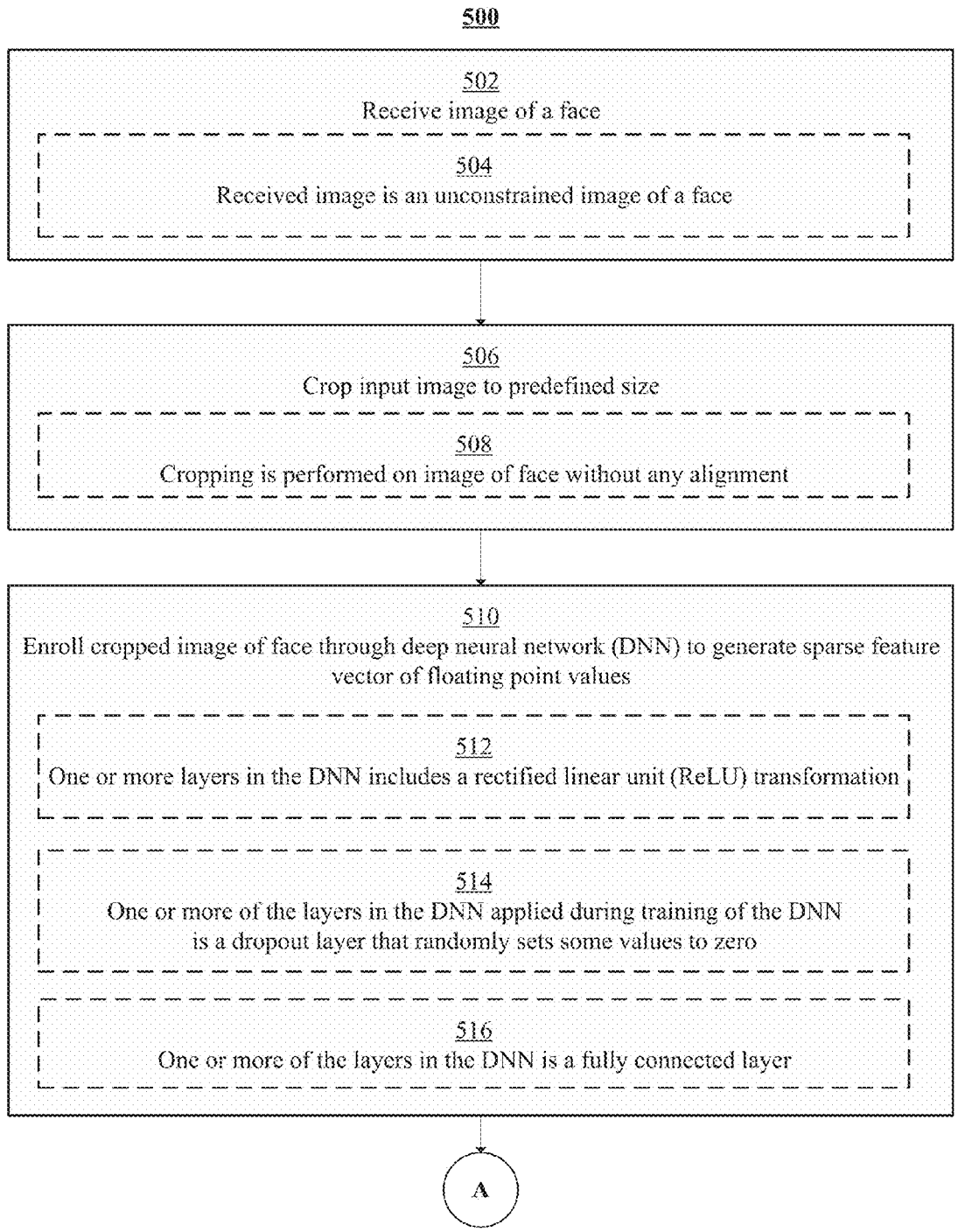
FIGS. 5A-5B are flow diagrams depicting a method for face recognition in accordance with some embodiments.
Figure 5B:
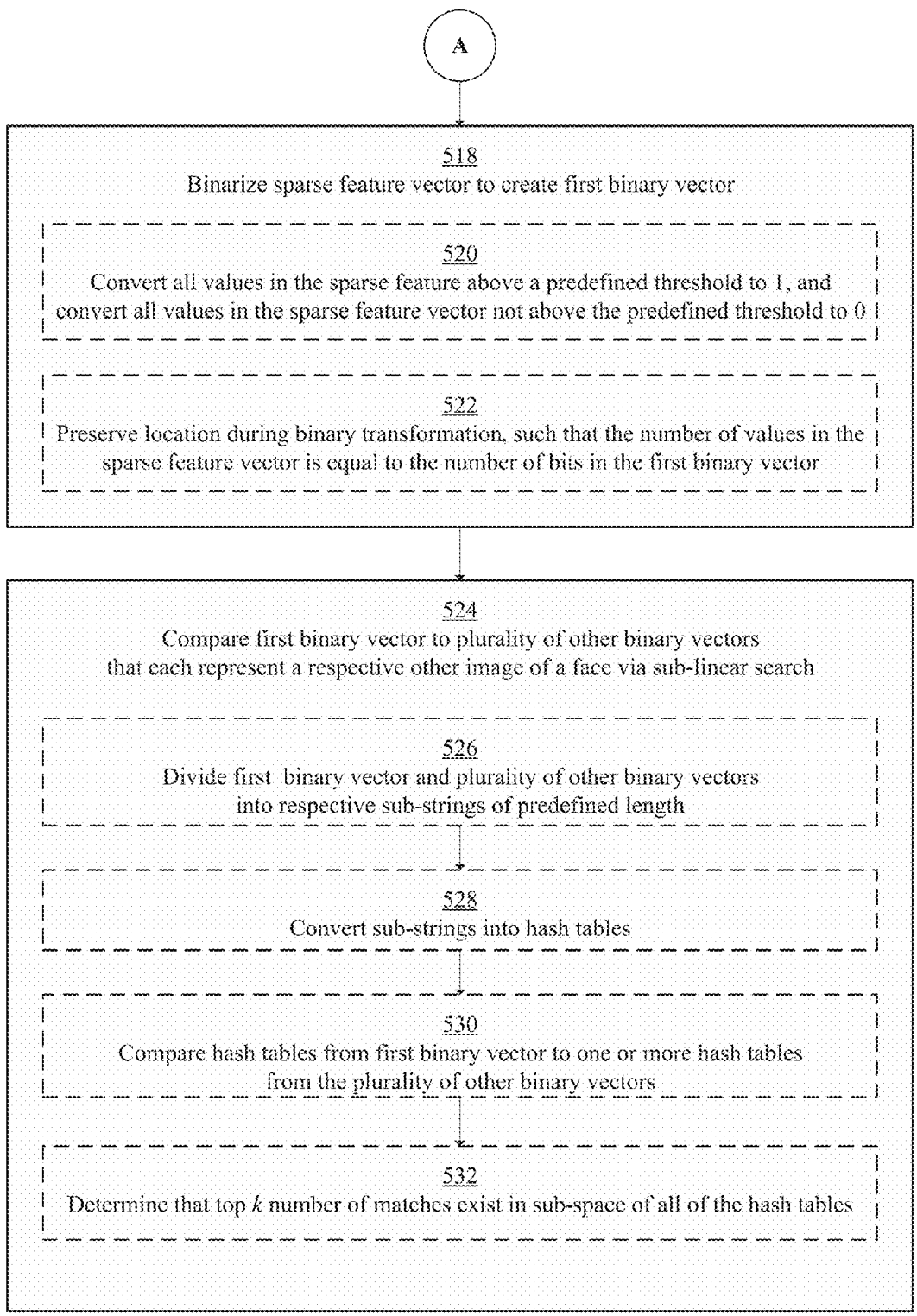

FIGS. 5A-5B represent a method for face recognition in accordance with some embodiments. The method 500 may be performed by a system such as the system 100 described above with reference to FIG. 1.

At block 502 in FIG. 5A, in some embodiments, the system receives an image of a face. The input image may be received by a search system 108 from a user device 110 or retrieved from the internet or any other computer network or computer database, based on a URL or a resource locator, which may itself be provided by a user device 110. In some embodiments the image may be received from a crawler server 202 as described above. In some embodiments, the input image may be received by ingestion system 102, rather than or in addition to search system 108. Either search system 108 or ingestion system 102 may subject the image to face recognition algorithm 104; for the purposes of describing method 500, this application will simply refer to steps being applied by system 100. The input image may be subject to a face detection algorithm executed by system 100 to detect the presence and location of faces in the image. In some embodiments, the image may be received in any standard image file format, including png, jpeg, bmp, dib, ras, or others.

At block 504, in some embodiments, the received image of a face is an unconstrained image of a face. In some embodiments, an unconstrained image of a face may be an image of a face that has an unbound pose, illumination, and/or expression. In some embodiments, an unconstrained image of a face may be an image of a face that was not intentionally created or selected in order to contain a face in a certain position, direction, size, and/or resolution in the photo (or not verified after the fact to have such an image of a face). In some embodiments, an unconstrained image of a face may be any image of a face that does not feature a substantially front-facing face. Images obtained from an internet crawler, from social media, and/or from surveillance video may be unconstrained images of faces.

At block 506, in some embodiments, the system crops the received image of a face to a predefined size. In some embodiments, the input image may be subject to a face detection algorithm executed by system 100 to detect the presence and location of faces in the image. If a face is detected in the image, then the face recognition algorithm may output a rectangle surrounding a detected face. The system may crop the image in accordance with the rectangle returned by the face detection algorithm, and the cropped image may be resized to be a predetermined size image. In some embodiments, the resizing may be done using a linear interpolation method.

The predetermined image size may be set or adjusted by a user of the system, or it may be dynamically determined by the system itself, for example based on the parameters of a DNN by which the system will process the cropped and resized image. In some embodiments, the resized image is a square with each side being length such as 100 pixels, 200 pixels, 300 pixels, or more than 300 pixels. Other sizes may also be used. In one example, cropped and resized images are 224×224 pixels.

In some embodiments, the cropped and resized image is a color image (RGB channels), such that each pixel in the cropped/resized image comprises three unsigned 8-bit numbers that give values from 0-255, one value each corresponding to the red, green, and blue color channels. In the example of a 224×224 pixel image, where each pixel in the image is represented by three values, the image may be said to be 224×224×3 image of unsigned 8-bit values.

At block 508, in some embodiments, the cropping is performed on the image of the face without any alignment. In some embodiments, it may be advantageous to proceed with the detection, cropping, and resizing steps of a face recognition algorithm without subjecting input images to any alignment. This may be particularly advantageous in algorithms in which images are to be processed by a DNN that has been trained on un-aligned images. In some embodiments, alignment techniques may not work well on un-constrained faces, so more accurate and reliable results may be obtained by training a DNN on un-aligned and/or un-constrained images than by attempting to apply alignment techniques to constrained and/or un-constrained images.

At block 510, in some embodiments, the system enrolls the cropped image of the face through a deep neural network (DNN) to generate a sparse feature vector of floating point values.

A DNN may be a non-linear classifier that separates high-dimensional spaces based on labelled training data. Given a training set with a plurality of k-dimensional samples each with a label Y belonging to C classes, a DNN may try to segment the k-dimensional space into C regions, where each region contains a pure subset of all the samples with label y. In the field of face-recognition, a training set may be a set of manually labeled/tagged images of faces, such that the DNN may know which training images do and do not correspond to the same person's face. For example, a DNN may be trained on a large set of manually-tagged images of faces, such as on the order of 1 million images of faces or more. In some embodiments, a DNN may be trained on even larger sets of images of faces, such as on the order of hundreds of millions or billions of images of manually-tagged images of faces. For example, very large sets of manually-tagged images of faces may be available via social media platforms—such as Facebook, Instagram, or the like—in which users manually tag photos of faces by associating the photos with the identity of the person featured in the photo. These social media sources may provide access to hundreds of millions or billions of tagged images of faces, although DNN's may be effectively trained on smaller image sets.

DNN's may offer improvements over traditional machine-learning algorithms in the field of face recognition. For example, traditional machine learning algorithms work on fixed features. For example, legacy face matchers used anthropometric distances (eye-to-eye distance, eye-to-nose distance) that were presumed by human designers to be effective differentiators between images of faces of different people. Given an input face, a legacy algorithm could describe it using a set of k of these distances encoded into a feature vector. Given a set containing a plurality of these feature vectors, a machine learning algorithm like a SVM (support vector machine) would try to define functions in the k-dimensional space to separate the samples into identities. Thus, feature extraction and classification were independent of one another. That is to say, historically, feature extraction has been an engineered approach designed by human beings, while classification has been a machine-learned approach. DNN's offer an improvement to that paradigm, because DNN's may learn both the feature extraction and the classification at the same time, without human engineering. For example, rather than manually instructing a system to use eye-to-eye distance as one of the k dimensions in a feature vector, a DNN may automatically define, test, and decide upon what meaning should be assigned to each dimension of a feature vector. This may make DNN's far more powerful than legacy methods, as DNN's may learn not just how to segment a space populated by label features but also where to place samples in the space so that classification is more effective, efficient, accurate, and meaningful.

In method 500, it should be noted that enrollment at block 510 may take place with respect to a single input image for which a search or comparison is to be run (or for which a feature vector and/or binary vector is to be added to a database or to a plurality of gallery files). At this stage, training of the DNN (discussed further below) may already have taken place, during which the DNN was trained on labeled/tagged training images. In some embodiments, the DNN may be iteratively re-trained based on additional images; however, method 500 will address the case in which DNN training is complete and the DNN is simply processing an un-labeled/un-tagged image in order to generate a sparse feature vector. (Note that, in some embodiments, the DNN logic and layers applied during training may be different in one or more ways from the DNN logic and layers applied during enrollment of images for searching/comparison.)

In some embodiments, one or more layers (each representing a stage through which data is manipulated in the DNN) from known DNN's may be used or adopted for use in the DNN of method 500. Each layer may perform a linear transformation and/or a non-linear transformation on the data being processed by the DNN, before forwarding the data to the next layer for additional processing. For example, one or more layers from the Visual Geometry Group (VGG) DNN may be used to process input images of faces; certain layers of a pre-existing DNN may be modified or reconfigured, or layers may be removed, or additional layers may be added, in accordance with the needs of a system and the desired form of output.

The output of the DNN may be a sparse feature vector, which may be defined as a feature vector having a value of zero in more than a predefined percentage of its dimensions, such as more than 10%, 20%, 25%, 50%, 75%, 80%, 90%, 95%, or 99%. As will be discussed further below, one or more of the layers of the DNN may be specifically configured in order to achieve sparsity in output feature vectors by forcing or encouraging one or more values in feature vectors to be set to zero. One advantage of sparse feature vectors is that they may be effectively binarized (as will be discussed below) into compact binary vectors, which may allow for efficient searching and comparison of binary vectors, such as by sub-linear searching.

In some embodiments, the DNN may be configured to generate sparse feature vectors having a fixed number of dimensions (e.g., a fixed number of values or elements in each vector). The number of dimensions in an output feature vector may be defined by a final layer of a DNN, which may reduce a larger number of dimensions to the final output number of dimensions. In some embodiments, the number of dimensions in output vectors may be adjustable by a user, or may be dynamically determined by the system. In some embodiments, output feature vectors having 320 dimensions, 512 dimensions, 1024 dimensions, 2048 dimensions, 4096 dimensions, or other suitable numbers of dimensions may be used. The number of dimensions for an output feature vector may be chosen or set, in some embodiments, in accordance with constraints of file size, such that feature vectors are small enough to be stored in large quantities or to be transmitted quickly and efficiently. In some embodiments, output feature vectors may have 256 dimensions, which may be an advantageous size because it may be fit into two 128-bit machine instructions.

At block 512, in some embodiments, one or more layers in the DNN include a rectified linear unit (ReLU) transformation. This transformation may be understood as a "max(0, value)" function that is a non-linear transformation, forcing negative values to zero. Applying this transformation to the data in the DNN may be advantageous because it may cause paths in the network to be set to zero, such that the path will not be used for further computation on the data. Setting a path to zero may be referred to as the path "dying" in DNN processing.

In some embodiments, one or more ReLU layers may be applied both during training and during enrollment for searching. Using a ReLU layer to force certain paths to zero may increase the sparsity of the feature vectors that a DNN ultimately outputs, which may aid in creating a compact sparse feature vector (and ultimately a compact binary vector), as well as ensuring that surviving non-zero paths are more meaningful and effectively differentiating when they pass through a DNN that was trained with a ReLU layer forcing some paths to zero. Using multiple non-linear components such as ReLU's may be advantageous in that it may allow a DNN to meaningfully model more complex relationships.

At block 514, in some embodiments, one or more of the layers in the DNN applied during training of the DNN is a dropout later that randomly sets some values to zero. In some embodiments, a dropout layer may randomly set a fixed percentage or fixed number of values passing through the layer to zero. In some embodiments, the fixed number or percentage or values may be a fixed number of all values or of all dimensions in the layer, while in some embodiments, the fixed percentage or fixed number may be taken only from values that are not already set to zero at the time that the data arrives at the dropout layer. In some embodiments, the percentage of values set to zero may be 10%, 25%, 50%, 75%, or 90% of values. In some embodiments, the number of values set to zero may itself be randomized, such that it is randomly generated to fall within a predefined range for each time the dropout layer is applied to new data.

In some embodiments, a dropout layer may be applied during training of a DNN but not during enrollment of images through the DNN for searching/comparison. In some embodiments, enrollment and training iterations of the DNN may differ only by the application of a dropout layer, while in some other embodiments there may also be additional differences. Applying a dropout layer during training may be advantageous because, by setting and/or forcing values to zero during training, a system can ensure that non-zero values are more discriminative, and may increase the value and reliability in differentiating images of different faces for the paths that successfully pass through the DNN and are not set to zero by the dropout layer. (During enrollment of images for comparison/searching after the DNN has been trained, there may be no further need to apply a dropout layer, because the trained DNN may have already learned the optimal discriminative paths, and introducing further randomness after training may simply lower accuracy.)

At block 516, in some embodiments, one or more of the layers in the DNN is a fully connected layer. In some embodiments, one or more fully connected layers may be applied both during training and during enrollment for searching. In some embodiments, the fully-connected layer may be the final layer (e.g., the last processing step) in the DNN.

In some embodiments, the fully connected layer is a one-dimensional layer of neurons in which each neuron in the fully connected layer is connected to every neuron in the immediately preceding layer. The number of neurons in the fully connected layer may define the number of dimensions of output feature vectors from the DNN when the fully connected layer is the final layer in the DNN. Thus, the number of neurons in the fully connected layer may be set or determined in any of the manners discussed above for setting or determining the number of dimensions for the output feature vector of the DNN. In some embodiments, the number of neurons in the fully connected layer may be 32, 64, 128, 256, 320, 512, 1024, 2048, 4096, or other suitable values.

In some embodiments, the fully connected layer may serve to reduce the number of dimensions of the data being processed by the DNN to the final number of dimensions that is output in the resulting output feature vector. In some embodiments, it may be advantageous to reduce the number of dimensions significantly in order to achieve a compact output feature vector. In some embodiments, it may be advantageous to not reduce the number of dimensions too drastically by a single fully connected layer step, so as not to lose too much meaningful information and sacrifice accuracy. In some embodiments, a fully connected layer that reduces the number of dimensions of the data by approximately one order of magnitude may strike an effective balance between creating a compact feature vector and not sacrificing too much information or significantly impeding accuracy. For example, when data arriving at a final fully connected layer in a DNN has 4096 dimensions, the fully-connected later may reduce the 4096-dimensional data to a 256-dimension sparse feature vector that is sufficiently compact to be binarized for rapid sub-linear searching, while still sufficiently discriminative and accurate to effectively differentiate images of faces, for example within 10% or within 20% of the accuracy of leading systems that do not use sparse feature vectors, compact binaries, or sub-linear searching (and that accordingly take far longer to process).

As explained above, in some embodiments, a fully connected layer may be the final layer in a DNN. In some embodiments, a fully connected layer may be the final layer in a DNN for purposes of enrollment of images for comparison/searching, but the same fully connected layer may not be the final layer in iterations of the DNN run for training purposes. That is, additional layers following the fully connected layer may be present in some DNN's when the DNN's are run for training purposes. For example, in some embodiments, following a dropout layer that is the final layer in a DNN for enrollment purposes, the corresponding DNN may have two additional layers for training purposes.

First, the DNN may have a second fully connected layer (immediately following the first discussed above) for training, where the number of neurons in the second fully connected is equal to the number of unique subjects in a training set. (For example, if there are 2,000 unique subjects in a training set of images of faces, then the second gully connected layer may have 2,000 neurons. In one example, a training set has 2,622 unique subjects, and the second fully-connected layer accordingly has 2,622 neurons.)

Second, following the second fully connected layer, the DNN may have a layer implementing a softmax function for training. In some embodiments, the softmax function takes a set of values (e.g., 2622 values, one for each output from the second fully-connected layer) and turns them into a probability distribution, with larger values getting a higher probability and all of the values summing to 1. During training, a sample should have a probability distribution that is equal to 1 for the corresponding subject and equal to 0 everywhere else. When training starts, the actual probability distribution may be random, because the network hasn't learned anything yet. A back propagation algorithm may be used in some embodiments to push the network towards the correct solution. Each iterative push may be very small, but hundreds of thousands or millions of iterations may be run in order to allow the network to converge on a set of weights that give a more accurate probability distribution for all of the training samples. The fixed output vector may work well for training, when the number of subjects is fixed.

For enrollment of images for comparison/searching, however, the number of subjects may be unknown. Thus, it may be observed for enrollment that, while the last layer is training-subject specific, the second-to-last layer is not and it should contain a very discriminative representation of faces, as it is only one transformation away from a final output. Therefore, for enrollment purposes, in some embodiments, the final two training layers discussed above may not be used, and the dropout layer discussed above also may not be used.

At block 518 in FIG. 5B, in some embodiments, the system binarizes the sparse feature vector to create a first binary vector. In some embodiments, this binarization step may be a human-designed or human-engineered step, rather than an additional layer trained or otherwise configured by a DNN. Binarization of the sparse feature vector may include converting all values in the sparse feature vector to either 1 or 0, in accordance with one or more predefined criteria. Converting a sparse feature vector having floating point values and non-zero, non-one values into a binary vector having only zero- and one-values may be advantageous because, in some embodiments, location in vectors generated by DNN's to represent images of faces may be more important than magnitude. That is to say, the location of a value (e.g., which position the value is at in the vector, representing the path that a value took through a DNN) in a vector representing an image of a face may be more important and more meaningful, in reliably distinguishing images of faces from one another, than the magnitude of the value. Accordingly, collapsing all values to either zero or one preserves more location-based discriminate information while sacrificing some magnitude-based discriminate information. Because the location-based information is, in some embodiments, more important and more meaningful, this trade-off may be efficient in creating a significantly more compact representation, allowing fast and efficient searching and comparison without sacrificing too much accuracy or reliability.

Additional benefits to converting sparse feature vectors to binary vectors includes at least the following: (1) a compact binary representation may only require a small amount of space in RAM, increasing the number of templates that may be efficiently searched; (2) binary data may be inherently more efficient for a computer to process meaning comparison speed for binary vectors may be much faster per template then an implementation that relies on floating point; and (3) properties of the binary vector (including that each location can only have one of two possible values) enable finding the closest matches without doing a brute force linear search, as will be discussed below in further detail with respect to sub-linear searching techniques.

For example, a binary vector created from a 256-dimension sparse feature vector may be only 256 bits total, or 32 bytes. If the original cropped image of a face was 224×224×3, as discussed above, then this final result is about 5000× smaller than the original cropped image of a face. This size may also be 40-50× smaller than most known COTS algorithms, and 4-5× smaller than other known compact representations of images of faces. In cases where only 20%, 10%, 5%, 1%, or even less accuracy is sacrificed by using a compact binary vector, then the smaller size than other representations may justify the small sacrifice in accuracy due to the significantly improved ability to efficiently store, transfer, and search through (as discussed below) smaller representations. For example, in one embodiment, a feature vector 16 KB in size was only shown to be 10% more accurate than a 32-byte binary vector prepared using the methods described herein, despite it being 500 times larger in size.

At block 520, in some embodiments, binarizing the sparse feature vector includes converting all values in the sparse feature vector above a predefined threshold value to one, and converting all values in the sparse feature vector not above the predefined threshold to zero. Any suitable threshold magnitude value may be used. In some embodiments, the threshold magnitude value may be zero, such that all positive values in the sparse feature vector are set to one in the corresponding binary vector, and all non-positive values (zeros and negative values) in the sparse feature vector may be set to zero in the corresponding binary vector. In some embodiments, using zero as a threshold magnitude value may be effective because it mirrors the ReLU used in the DNN.

At block 522, in some embodiments, binarizing the sparse feature vector includes preserving location during binary transformation, such that the number of values in the sparse feature vector is equal to the number of bits in the first binary vector. Preserving location during binary transformation (due, in some embodiments, to the fact that location is more valuable than magnitude) may include mapping each value in the respective k-dimensional sparse feature vector to a respective value in a k-dimensional binary vector, where respective values in each vectors are in the same relative position in each vector.

In some embodiments, the binary vector and/or the sparse feature vector created in accordance with image enrollment as explained above may be stored and/or transferred in any of the manners discussed above with respect to FIGS. 1-4, including saving the vectors as part of gallery files.

At block 524, in some embodiments, the system compares the first binary vector to a plurality of other binary vectors that each represent a respective other image of a face via a sub-linear search. The comparison step may, in some embodiments, aim to compare the first binary string to a large database of millions, hundreds, of millions, or billions of other binary vectors, in order to locate the top l number of matches from among all other binary vectors. In some embodiments, l may be adjustable by a user, in that it may be set as low as 1 (to return the top match), or may be set on the order of 10, 100, or 1000, such that additional searching (e.g., by manual human inspection or by further automated face-recognition techniques) may be used to identify the best matches in the top l matches returned by the initial comparison. In some embodiments, the comparison may return a subset of the top l matches, but the system may only have to search/compare against a subset of the database, where the subset is larger than l but is smaller than the total number of binary vectors in the database, where the subset is known to contain the top l matches along with some non-l matches.

In some embodiments, sub-linear search techniques may be applied to return top-l matches, where, rather than exhaustively comparing the first binary vector to every single other binary vector in a database, the sub-linear search techniques make a smaller number of comparisons in such a manner that the smaller number of comparisons may be able to reliably identify a subset of a the other binary vectors in the database, wherein the subset is known to contain the top l number of matches to the first binary vector. In some embodiments, given a total number N of other binary vectors to which the first binary vector may be compared, sub-linear searching may enable reliably returning the closest l number of matches, wherein the closest l number of matches may be returned after fewer than N total comparisons. In some embodiments, only log(N) comparisons may be required to be made, rather than the N comparisons that would be required for exhaustive linear searching. For example, in some embodiments, N may be above 100,000 or above 1,000,000, while l may be a number that is manageable for manual review by a human operator, such as a number below 500, below 100, or below 10. Applicable sub-linear searching techniques are shown, in some embodiments, in Mohammad Norouzi's paper titled *Fast Exact Search in Hamming Space with Multi-Index Hashing* (available at https://arxiv.org/pdf/1307.2982v3.pdf).

In some embodiments, sub-linear searching techniques may allow near-real-time searching against a database of hundreds of millions or billions of binary feature vectors or more, such that reliable match sets may be returned in less than 10 seconds, less than 5 seconds, less than 1 second, less than 0.1 seconds, or less than 0.01 seconds. In a system with a user searching against a large gallery (such as a gallery with millions, hundreds of millions, or billions of files), sub-linear searching techniques may allow a significant reduction in latency between searches as compared to exhaustive linear searching techniques. In some embodiments, non-linear search times may be decreased to less than 50%, less than 25%, less than 10%, less than 5%, or less than 1% of search times for brute-force linear methods. For example, in a system with N gallery templates where N is 1000, and assuming a comparison time of 1 second per comparison, a brute force linear search would take 1000 seconds, while a sub-linear search may take approximately 10 seconds (log_2(1000)). In some examples, as discussed further below, hash tables may be built from sub-strings of the binary vectors in order to enable searching that returns the l-nearest neighbors in Hamming space from among large sets at run-time speeds that may be shown to be sub-linear.

At block 526, in some embodiments, comparing the first binary vector includes dividing the first binary vector and the plurality of other binary vectors into respective substrings of predefined length. In some embodiments, each sub-string into which the binary vectors are divided are of a same predetermined length, which may be set to any suitable length in accordance with the needs of a system and the preferences of a user. In some embodiments, the sub-strings may be on the order of 10% of the total length of the vector strings. For example, if a binary vector is 1000 bits, then each sub string may be 100 bits, or may be between 50 and 150 bits. For binary vectors of different numbers of bits, the same or similar proportions may apply to the number of bits in the sub-strings. In one example, when the binary vectors are 256-bit (32-byte), then each binary vector may be divided into 16 sub-strings of 16 bits each.

At block 528, in some embodiments, comparing the first binary vector includes using one or more or each of the sub-strings of the other binary vectors to create hash tables. In some embodiments, hash tables may be created from the gallery/candidate/database sub-strings. In some embodiments, M hash-tables may be created, where M is the number of substrings into which a single binary vector is divided (e.g., 16). To create the ith hash table, all of the ith sub-strings from each gallery binary vector may be added. In each hash table, it may be expected that a number of hash collisions will occur, where multiple gallery templates have the same ith substring. For example, in the case of 16-bit binary keys, there are only 2^16 (65536) unique keys. Thus, any gallery larger than 65536 is guaranteed to have hash collisions; furthermore, because codes are unlikely to be perfectly distributed, galleries smaller than that will also most likely also have many hash collisions. In some embodiments, each key in a hash table may be thought of as referring to a "bucket". In some embodiments, each template in the gallery may be assigned a unique integer key from 0-N. When a gallery substring is inserted into a hash table, the system may look up the bucket associated with its substring and add the unique key to the bucket. After all N gallery templates are added, each possible key in the hash table will be associated with a bucket that has 0 or more unique keys in it.

At block 530, in some embodiments, comparing the first binary vector includes comparing sub-strings from the first binary vector to one or more hash tables created from the plurality of other binary vectors. In some embodiments, the comparison may be done in Hamming Space, which may obviate the need for an exhaustive linear comparison to each and every hash table in the database. In comparing substrings to hash tables in Hamming Space, a user may be able to adjust the number of bits that difference that is permissible for another hash table to be considered as indicating as a match.

In some embodiments, in order to compare a binary vector corresponding to an input image against the gallery/database, the binary vector is divided into M substrings, just as the binaries in the gallery were. Any gallery vector exactly equal to the input/query vector may be trivially located by retrieving the M buckets associated with the M query substrings and seeing if any unique keys appear in all M buckets. To find nearby vectors, the system may look in nearby buckets in each hash table. To find vectors that have a Hamming distance of 1 (a single bit in the vector is different) from the input/query vector, the system may look in each hash table bucket that is 1 bit different than the substring vector. For example, using a 4-bit substring for brevity, a substring 1010 may call for a comparison to the bins 0010, 1110, 1000, and 1011, as those are the only bins in the substring hash table that are within a single bit of our query substring and thereby within a Hamming distance of 1. Note that, if the system located a gallery vector that was a single bit different from the query vector in 1 substring, the gallery vector may have to be equivalent in all of the other substrings for the total hamming distance to be 1 bit. Note also that, in some embodiments, there is no need for the system to consider a number of possible buckets in the substring hash table; for example, 0001 was not considered in the example above. In this manner, templates that are known to be too different from a query template may not even need to be considered during the comparison process.

In some embodiments, in order to return the requested 1 number of closes matches requested by a user, a search within 1 bit of difference may not return enough results. Thus, the system may use an iterative process that first looks 0 bits away, then looks 1 bit away if not enough results are returned within 0 bits, then looks 2 bits away if not enough results are returned within 1 bit, and so on until 1 closest matches are successfully located and may be returned to a user. In a uniform hash space, where every bucket has the same number of entries, it may be proven how many bits away a system is required to look for a value before finding L matches. In a non-uniform hash space (which, may be the case in a hash space created based on a gallery of binary vector representing images of faces), it may not be known a priori how many bits away a system will be required to look, and thus the exact number of comparisons that a system will need to make in order to locate a top l number of matches may not be known. However, it may be expected that the number of searches required will be significantly less than N in the typical case of a user requesting a number of results l that is several orders of magnitude smaller than N (e.g., a user requesting the top 100 results from a database containing 1 billion candidates).

At block 532, in some embodiments, comparing the first binary vector includes locating a top l number of matches from among all candidate/gallery binary vectors without exhaustively comparing the binary vector representing the input image of a face to each and every candidate/gallery binary vector. For example, in some embodiments, l may be adjustable by a user, in that it may be set as low as 1 (to return the top match), or may be set on the order of 10, 100, or 1000, such that additional searching (e.g., by manual human inspection or by further automated face-recognition techniques) may be used to identify the best matches in the top l matches returned by the initial comparison. In some embodiments, the system may enable knowing to a mathematical certainty or near-certainty that the top l matches may be located by searching in a sub-space smaller than the space defined by all gallery/database binary vectors, such as knowing with 90% certainty, 95% certainty, 99% certainty, 99.9% certainty, or 100% certainty. Thus, sub-linear searching using hash tables built from sub-strings of binary vectors may enable reliably ruling out certain image candidates without exhaustively searching every image candidate, with certainty above the certainty thresholds discussed above, up to and including 100% certainty.

In some embodiments, accurate and efficient sub-linear searching in accordance with the methods discussed above may require binary vectors that are sufficiently small, such as less than 256 bits. While sub-linear search techniques may be effective in speeding search speeds for data sets of up to one billion codes of 64 bits, 128 bits, or 256 bits each, it is possible that larger file sizes could slow such algorithms dramatically, or that they could prevent the algorithm from functioning properly and being mathematically reliable. Because very compact binary vectors are required for such sub-linear search techniques to be effective and reliable, the techniques explained above for creating extremely compact (e.g., 256 bits or less) binary vector representations of faces may be critical in enabling sub-linear fast-searching of databases of hundreds of millions or billions of other images of faces.

As discussed above, method 500 as discussed herein may enable the creation of a small enough (e.g., 256 bits or less) binary representation of a face in order for sub-linear search techniques to be possible. Furthermore, the binary representations created in accordance with method 500 may also be sufficiently accurate in order for matches returned to be meaningful and reliable in locating matching faces and differentiating non-matching faces. For example, binary representations created in accordance with the techniques discussed herein may be accurate (defined using a ROC curve or a CMC curve) within 10% or 20% of the accuracy of leading systems that do not use sparse feature vectors, compact binaries, or sub-linear searching (and that accordingly take far longer to process).

Example 1

Figure 6:
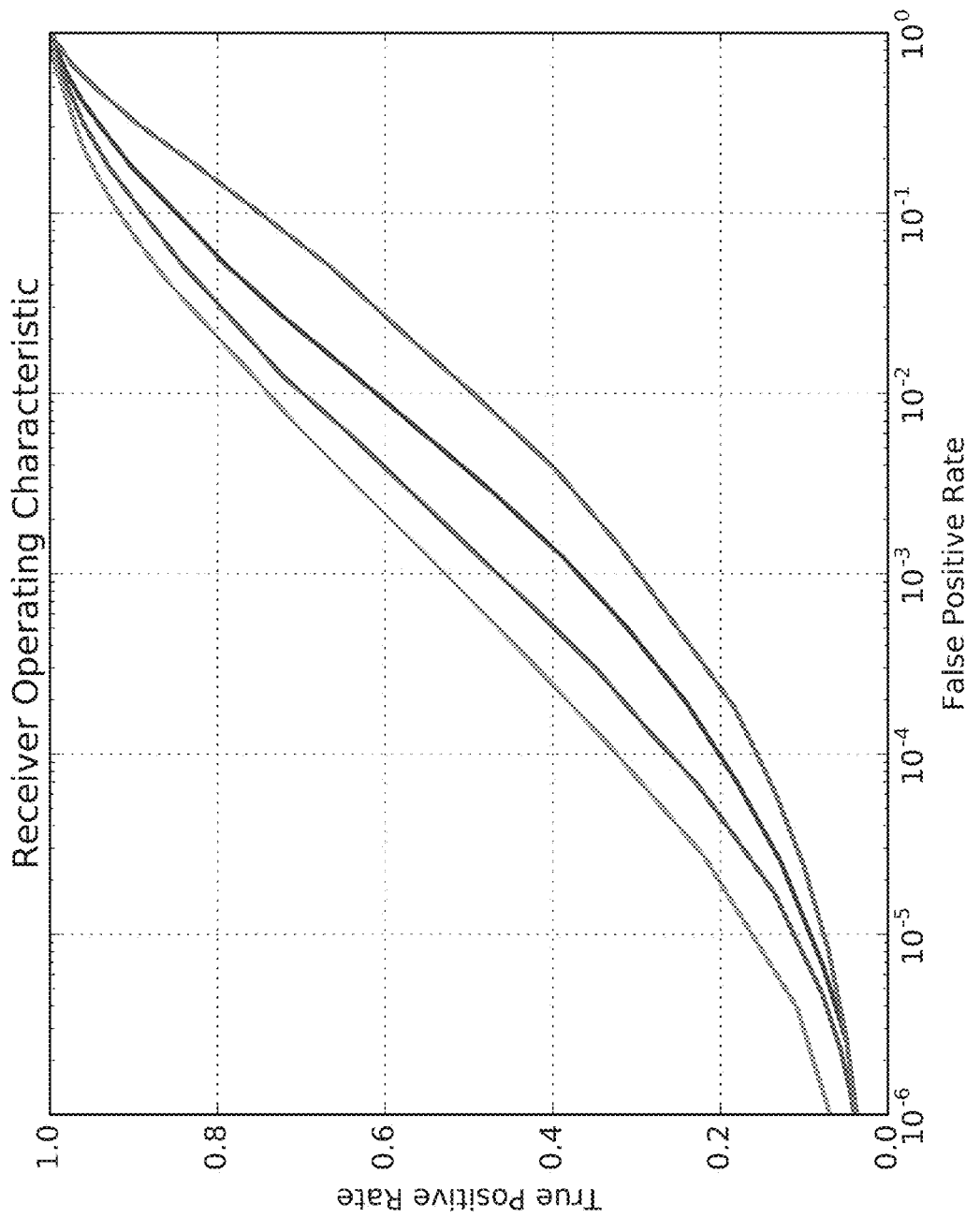
FIG. 6 is a graph showing receiver operating characteristic (ROC) of a system in accordance with some embodiments.

As shown in FIG. 6, in one example, a receiver operating characteristic graph was produced showing true positive rate against false positive rate for four systems implementing certain methods disclosed herein. The uppermost curve shows results from a system using 4096-dimensional floating point vectors (16 KB). The second-to-uppermost curve shows results from a system using 256 dimensional floating point vectors (1 KB). The second-to-lowermost curve shows results from a system using 256 dimensional binary vectors (32 bytes). The lowermost curve shows results from a system using 4096 dimensional binary vectors (512 bytes).

As shown in FIG. 7, in one example, a cumulative match curve (CMC) graph was produced showing retrieval rate against rank for four systems implementing certain methods disclosed herein. The uppermost curve shows results from a system using 4096-dimensional floating point vectors (16 KB). The second-to-uppermost curve shows results from a system using 256 dimensional floating point vectors (1 KB). The curve that is second-to-lowermost on the left-hand side of the graph shows results from a system using 256 dimensional binary vectors (32 bytes). The curve that is lowermost on the left-hand side of the graph shows results from a system using 4096 dimensional binary vectors (512 bytes).

What is claimed is:

1. A method, performed by a search system including one or more servers for enrollment and searching, for searching a database of gallery binary vectors representing gallery images of faces, comprising:
   receiving an input image of a face;

processing the received input image of the face, comprising:
processing through a plurality of layers of a deep neural network (DNN) to generate a k-dimensional feature vector; and
binarizing the feature vector to generate a k-dimensional binary vector by converting respective values in the feature vector to corresponding values of 0 or 1 in the binary vector, wherein the conversion is based on whether respective values in the feature vector satisfy predefined criteria;
dividing the binary vector into a plurality of sub-strings;
creating a plurality of hash tables based on gallery sub-strings of gallery binary vectors; and
comparing one or more of the sub-strings of the binary vector to the one or more of the hash tables to identify a subset of the gallery binary vectors that are closest matches to the binary vector.

2. The method of claim 1, wherein processing the received input image of the face comprises, prior to processing the image through the DNN, cropping the input image of the face to a predefined size.

3. The method of claim 1, wherein identifying the subset of the gallery binary vectors that are the closest matches is based on a number of comparisons that is fewer than a total number of gallery binary vectors from which the closest matches are identified.

4. The method of claim 1, wherein identifying the subset of the gallery binary vectors that are the closest matches is based on a number of comparisons that is equal to or less than log(N), where N is a total number of gallery binary vectors from which the closest matches are identified.

5. The method of claim 1, wherein the DNN comprises a fully connected layer configured to reduce dimensionality in the output k-dimensional feature vector to k.

6. The method of claim 1, wherein k is less than 1/500 the number of data dimensions the cropped input image of the face input into DNN.

7. The method of claim 1, wherein k is 256.

8. The method of claim 1, wherein the binary vector is less than 1/4000 the file size of the cropped input image of the face input into the DNN.

9. The method of claim 1, wherein the binary vector is 32 bytes in file size.

10. A system, for searching a database of gallery binary vectors representing gallery images of faces, the system comprising one or more servers for enrollment and searching and memory, the memory storing instructions that, when executed by the one or more servers, cause the one or more servers to:
receive an input image of a face;
process the received input image of the face, comprising:
processing through a plurality of layers of a deep neural network (DNN) to generate a k-dimensional feature vector; and
binarizing the feature vector to generate a k-dimensional binary vector by converting respective values in the feature vector to corresponding values of 0 or 1 in the binary vector, wherein the conversion is based on whether respective values in the feature vector satisfy predefined criteria;
divide the binary vector into a plurality of sub-strings;
create a plurality of hash tables based on gallery sub-strings of gallery binary vectors; and
compare one or more of the sub-strings of the binary vector to the one or more of the hash tables to identify a subset of the gallery binary vectors that are closest matches to the binary vector.

11. The system of claim 10, wherein processing the received input image of the face comprises, prior to processing the image through the DNN, cropping the input image of the face to a predefined size.

12. The system of claim 10, wherein identifying the subset of the gallery binary vectors that are the closest matches is based on a number of comparisons that is fewer than a total number of gallery binary vectors from which the closest matches are identified.

13. The system of claim 10, wherein identifying the subset of the gallery binary vectors that are the closest matches is based on a number of comparisons that is equal to or less than log(N), where N is a total number of gallery binary vectors from which the closest matches are identified.

14. The system of claim 10, wherein the DNN comprises a fully connected layer configured to reduce dimensionality in the output k-dimensional feature vector to k.

15. The system of claim 10, wherein k is less than 1/500 the number of data dimensions the cropped input image of the face input into DNN.

16. The system of claim 10, wherein k is 256.

17. The system of claim 10, wherein the binary vector is less than 1/4000 the file size of the cropped input image of the face input into the DNN.

18. The system of claim 10, wherein the binary vector is 32 bytes in file size.

19. A non-transitory computer-readable storage medium storing instructions that, when executed by one or more servers for enrollment and searching, cause the one or more servers to:
receive an input image of a face;
process the received input image of the face, comprising:
processing through a plurality of layers of a deep neural network (DNN) to generate a k-dimensional feature vector; and
binarizing the feature vector to generate a k-dimensional binary vector by converting respective values in the feature vector to corresponding values of 0 or 1 in the binary vector, wherein the conversion is based on whether respective values in the feature vector satisfy predefined criteria;
divide the binary vector into a plurality of sub-strings;
create a plurality of hash tables based on gallery sub-strings of gallery binary vectors; and
compare one or more of the sub-strings of the binary vector to the one or more of the hash tables to identify a subset of the gallery binary vectors that are closest matches to the binary vector.

20. The non-transitory computer-readable storage medium of claim 19, wherein processing the received input image of the face comprises, prior to processing the image through the DNN, cropping the input image of the face to a predefined size.

21. The non-transitory computer-readable storage medium of claim 19, wherein identifying the subset of the gallery binary vectors that are the closest matches is based on a number of comparisons that is fewer than a total number of gallery binary vectors from which the closest matches are identified.

22. The non-transitory computer-readable storage medium of claim 19, wherein identifying the subset of the gallery binary vectors that are the closest matches is based on a number of comparisons that is equal to or less than log(N), where N is a total number of gallery binary vectors from which the closest matches are identified.

23. The non-transitory computer-readable storage medium of claim 19, wherein the DNN comprises a fully connected layer configured to reduce dimensionality in the output k-dimensional feature vector to k.

24. The non-transitory computer-readable storage medium of claim 19, wherein k is less than 1/500 the number of data dimensions the cropped input image of the face input into DNN.

25. The non-transitory computer-readable storage medium of claim 19, wherein k is 256.

26. The non-transitory computer-readable storage medium of claim 19, wherein the binary vector is less than 1/4000 the file size of the cropped input image of the face input into the DNN.

27. The non-transitory computer-readable storage medium of claim 19, wherein the binary vector is 32 bytes in file size.

* * * * *